(12) United States Patent
Hogeg et al.

(10) Patent No.: US 10,630,625 B2
(45) Date of Patent: Apr. 21, 2020

(54) MEDIA OBJECT DISTRIBUTION

(71) Applicant: Snap Inc., Santa Monica, CA (US)

(72) Inventors: Moshe Hogeg, Meitar (IL); Ido Sadeh, Ramat-Gun (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 14/797,263

(22) Filed: Jul. 13, 2015

(65) Prior Publication Data

US 2016/0014063 A1 Jan. 14, 2016

Related U.S. Application Data

(60) Provisional application No. 62/023,900, filed on Jul. 13, 2014.

(51) Int. Cl.
| | |
|---|---|
| *H04L 12/58* | (2006.01) |
| *H04W 4/12* | (2009.01) |
| *H04N 21/4788* | (2011.01) |
| *H04N 21/61* | (2011.01) |
| *H04N 21/414* | (2011.01) |
| *G06F 16/958* | (2019.01) |

(52) U.S. Cl.
CPC .......... *H04L 51/14* (2013.01); *G06F 16/972* (2019.01); *H04L 51/10* (2013.01); *H04N 21/41407* (2013.01); *H04N 21/4788* (2013.01); *H04N 21/6125* (2013.01); *H04N 21/6175* (2013.01); *H04W 4/12* (2013.01)

(58) Field of Classification Search
CPC ... H04L 51/14; H04L 51/10; G06F 17/30893; H04N 21/41407; H04N 21/4788; H04N 21/6125; H04N 21/6175; H04W 4/12
See application file for complete search history.

(56) References Cited

U.S. PATENT DOCUMENTS

| | | | |
|---|---|---|---|
| 7,428,580 B2 * | 9/2008 | Hullfish | H04L 51/04 455/466 |
| 8,909,725 B1 * | 12/2014 | Sehn | H04L 67/26 709/206 |
| 2003/0018726 A1 * | 1/2003 | Low | H04L 51/04 709/206 |
| 2003/0135562 A1 * | 7/2003 | Himmel | G06Q 10/10 709/206 |
| 2007/0233695 A1 * | 10/2007 | Boudreau | G01C 21/20 |

(Continued)

*Primary Examiner* — Quoc Thai N Vu (74) *Attorney, Agent, or Firm* — Schwegman Lundberg & Woessner, P.A.

(57) ABSTRACT

A method that comprises receiving at a network connected server from a first client terminal, a message comprising, an user application ID of a user selecting a media object using a user interface presented on a display of the first client terminal and the media object, generating a web document which presents a browser user interface and the media object when accessed by a browser, the web document having a network accessible storage address, sending the network accessible storage address from the network connected server to allow a browser installed in a second client terminal to use of the network accessible storage address to display the media object the browser user interface, identifying a usage of the browser user interface for inputting a reaction to the media object by a user of the second client terminal, and forwarding the reaction to the first client terminal using the sender user ID.

12 Claims, 6 Drawing Sheets

(56) References Cited

U.S. PATENT DOCUMENTS

2011/0179138 A1\* 7/2011 Van Geest ........ G06F 17/30902
709/217
2012/0110474 A1\* 5/2012 Chen ...................... G06Q 10/10
715/753

\* cited by examiner

MEDIA OBJECT DISTRIBUTION

RELATED APPLICATION

This application claims the benefit of priority under 35 USC 119(e) of U.S. Provisional Patent Application No. 62/023,900 filed Jul. 13, 2014, the contents of which are incorporated herein by reference in their entirety.

BACKGROUND

The present invention, in some embodiments thereof, relates to media messaging but not exclusively, to methods and systems of managing media messaging over communication networks.

One of the most popular communication technologies that have been developed for mobile communications systems is text messaging, in particular the short message service (SMS) and instant messaging (IM) that allows mobile users to receive text, image, audio and/or video messages via wireless communication devices, including SMS-capable cellular mobile phones. Mobile and stationary users can send messages to recipient users by entering a media message (e.g. text, image or video including messages) and the destination address of the recipient user, who can be either a mobile or a non-mobile user.

During the last years, various standards that allow sending messages that include multimedia objects, such as images, audio, video, rich text have been developed. Such standards have been adopted by social networks, facilitating the transmission of media content among friends.

SUMMARY

According to some embodiments of there is provided a method of managing media object based communication, implemented by a network connected server. The method comprises receiving at a network connected server from a first client terminal, a message comprising, an user application identifier (ID) of a user selecting a media object using a user interface presented on a display of the first client terminal and the media object, generating, in response to a reception of the message, a web document which presents a browser user interface and the media object when accessed by a browser, the web document having a network accessible storage address, sending the network accessible storage address from the network connected server to allow a browser installed in a second client terminal to use of the network accessible storage address to display the media object the browser user interface, identifying a usage of the browser user interface for inputting a reaction to the media object by a user of the second client terminal, and forwarding the reaction, via the network connected server, to the first client terminal using the user application user ID.

Optionally, the sending is performed in a member of a group consisting of a short message service (SMS) message, instant messaging (IM) message, and an electronic mail.

Optionally, the sending comprises forwarding the network accessible storage address to the first client terminal from and network connected server, wherein the sending is performed by the first client terminal.

More optionally, the second client terminal is associated with a contact member of the first client terminal; wherein the sending is performed by the first client terminal using an electronic mail (email) address or a telephone number of the contact member of the first client terminal.

Optionally, the generating comprises documenting a conversation ID in association with the user ID and adding the conversation ID to the network accessible storage address; wherein the identifying comprises using the conversation ID to match the user ID.

Optionally, the message comprises one of a target application user ID and a target ID selected from a group consisting of a target telephone number and an email address; further identifying a presence or an absence of the target ID in a user dataset. The sending, the identifying, and the forwarding are performed when the message does not comprise the target application user ID. When the message comprises the target application user ID a transmission of the media object in a packet-oriented message addressed to the target application user ID is performed.

Optionally, the transmission of the network accessible storage address to the second client terminal is performed by the network connected server.

Optionally, the web document is designed to present the media object on the browser for a limited period of less than 1 minute.

According to some embodiments of there is provided a system of managing media object based communication, implemented by a network connected server. The system comprises a processor, a network interface adapted to receive from a first client terminal, a message comprising, an user application identifier (ID) of a user selecting a media object using a user interface presented on a display of the first client terminal and the media object and a routing module executed using the processor and adapted to generate, in response to a reception of the message, a web document which presents a browser user interface and the media object when accessed by a browser, the web document having a network accessible storage address. The network interface is adapted to send the network accessible storage address to allow a browser installed in a second client terminal to use of the network accessible storage address to display the media object the browser user interface. The routing module is adapted to identify a usage of the browser user interface for inputting a reaction to the media object by a user of the second client terminal and to forward the reaction to the first client terminal using the sender user ID.

According to some embodiments of there is provided a method of transmitting content among a plurality of mobile communication devices. The method comprises acquiring contact information of a plurality of contact members used by a client terminal to establish a cellular communication channel with any of the plurality of contact members via a cellular network, identifying a selection of one of the plurality of contact members by a user of the client terminal, designating a media object, and determining a presence or an absence of a user application identifier for the selected contact member. When a presence of the application identifier is identified instructing the transmission of the media object in a packet-oriented message addressed to the application identifier. When an absence of the application identifier is identified instructing the transmission of a carrier message containing a network accessible storage address of a storage location of the media object using a cellular messaging service or an email service, the carrier message being addressed to a telephone number or an email of the selected contact member, the telephone number or the email is extracted from the contact information.

Optionally, the media object comprises at least one member of a group consisting of text content, a photograph, an audio content, and a video content, the at least one member being recorded in response to the selection.

Optionally, the designating comprises recording the media object using a media object designation interface presented on a display of the client terminal.

More optionally, the designating and the selection are performed in response to a common user input to the media object designation interface.

More optionally, the identifying a selection of one of the plurality of contact members comprises: generating an interactive palette which includes a plurality of selectable icons each one of the plurality of selectable icons is associated with one of the plurality of contact members, adding the interactive palette to the media object designation interface, presenting the media object designation interface with the interactive palette on the display, and identifying the selection based on a choice of one of the plurality of selectable icons by the user.

Optionally, the display is a touch screen and the selection is a single finger tap event on an area of the display which presents one of the plurality of selectable icons.

More optionally, the media object designation interface comprises an image or video capturing area which displays an output of an image sensor of the client terminal.

According to some embodiments of there is provided a client terminal for cellular communication. The client terminal comprises a contact capturing module adapted to acquire contact information of a plurality of contact members used by a client terminal to establish a cellular communication channel with any of the plurality of contact members via a cellular network, a user interface adapted to identify a selection of one of the plurality of contact members by a user of the client terminal and to designate a media object based on the selection, and a messaging router module adapted to identify a presence or an absence of an application identifier for the selected contact member. When a presence of the application identifier is identified the media object distribution module instructs the transmission of a packet-oriented message addressed to the application identifier to transfer the media object and when an absence of the application identifier is identified the media object distribution module instructs the transmission of a cellular message containing a network accessible storage address of a storage location of the media object using a cellular messaging service, the cellular message being addressed to a telephone number of the selected contact member which is extracted from the contact information.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to media messaging but not exclusively, to methods and systems of managing media messaging over communication networks.

According to some embodiments of the present invention, there are provided methods and systems for forwarding media object(s) from a user of an application to a recipient, for example one of her contact members, by automatically generating a web document, such as a website that includes the media object(s), optionally temporally, and sending the recipient with a reference (e.g. a link) to the web document via a carrier message such as an SMS or an email. The methods and systems may apply this forwarding whenever the user application ID of the recipient is not found in a registry of the application.

According to some embodiments of the present invention, there are provided methods and systems which allow a user who is uses a mobile application to exchange media objects (e.g. text, image, video, or audio content) with a user who does not use the mobile application. The exchange is based on the ability to generate automatically a web document which a reference thereto can be communicated via a cellular network and/or a packet oriented network based on a target address such as a phone number (e.g. for sending SMS), an electronic mail, and the like. The target address is optionally acquired from contact data which are available to the application user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
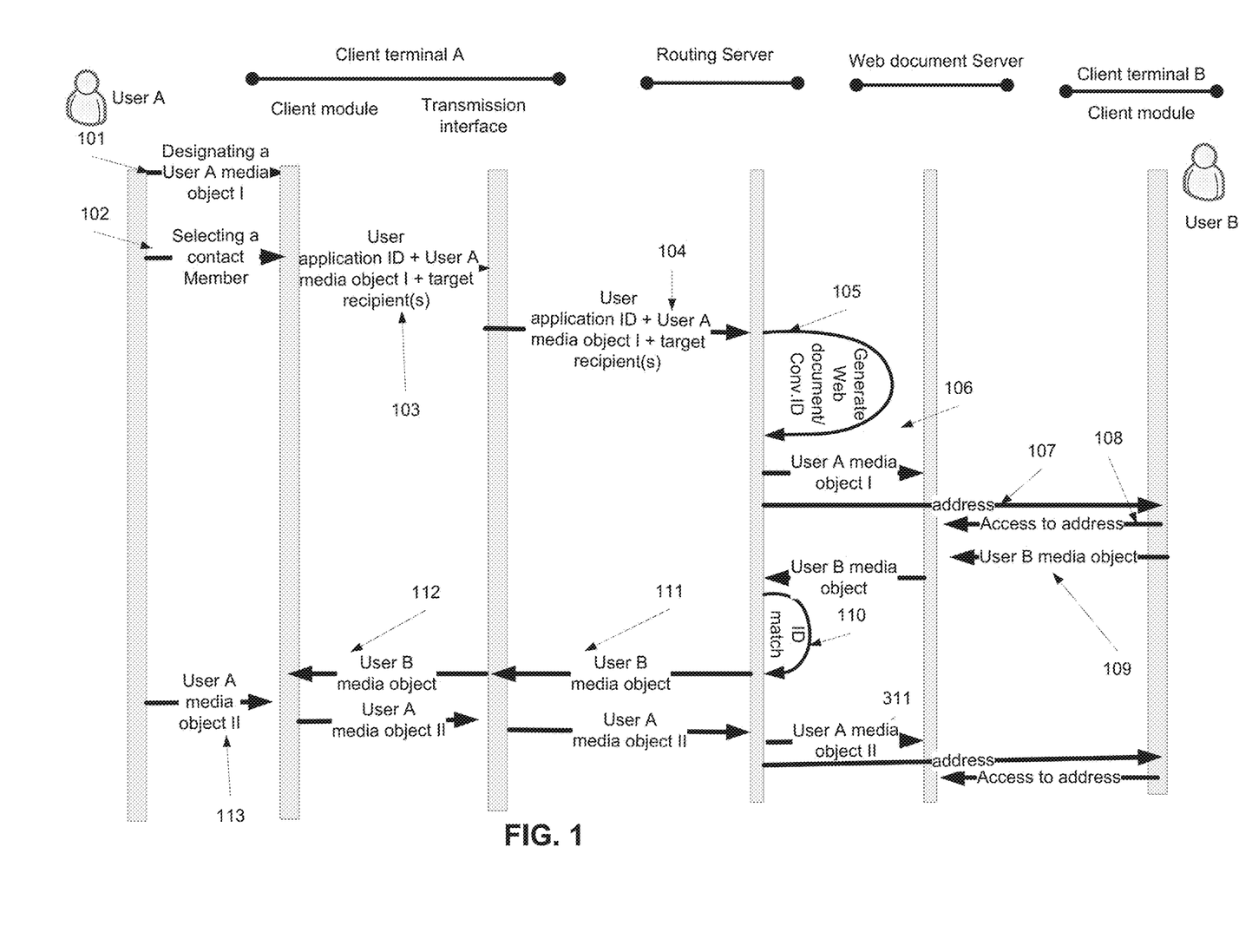
FIG. 1 is a sequence chart of a process allowing a user of an application to transmit a media object to one of his contact members, regardless of whether the target contact member is an application user or not, according to some embodiments of the present invention.

Reference is now made to FIG. 1, which is a sequence chart 100 of a process allowing a user of an application, referred to as a user or an application user (AU), to transmit a media object, such as a text content (e.g. one or more words or sentences), an image, an audio file and/or a video file, to one of his contact members, regardless of whether the target contact member is an application user registered to a service provided by the application users or a non application user, according to some embodiments of the present invention. The media object is designated by the user using an application user interface (UI) of the application. The user interface allows inputted text to a messaging editor and/or an image or a video or an audio captured in response to a user selection, for example by tapping on an icon of a contact member and/or a media object selected from a local or remote storage. The method is based on a chain of events which translate a simple user selection of a media object and a target contact, optionally simultaneously by a common input action such as one or more icon finger tap(s), to instructions to upload of the media object to a web document hosted by a remote server, connected to a computer packet network such as the internet. This makes the media object available at the remote server when a reference sent to the target contact member is used, for example a network address. The web document is optionally a webpage or any other network accessible destination. The reference to the web document is optionally a Uniform Resource Locator (URL) or a Universal Resource Identifier (URI). As explained above, the reference is forwarded in an SMS or an email to the target contact member, for example as described below. The method optionally allows the target contact member who accesses the web document using the reference, for instance via a browser, to respond to the media object which is shared therewith, for example by submitting another media object in a graphical user interface (GUI) made available at the web document. As described below, the process depicted in FIG. 1 may used the target contact member is not subscribed to the service provided by the application, for example when the application is not installed at his client terminal. In such embodiments, when the contact member is a subscribed application user, another process for directly distributing the media object (not via a web document) is used, for example see FIG. 7 which is described below.

Figure 2:
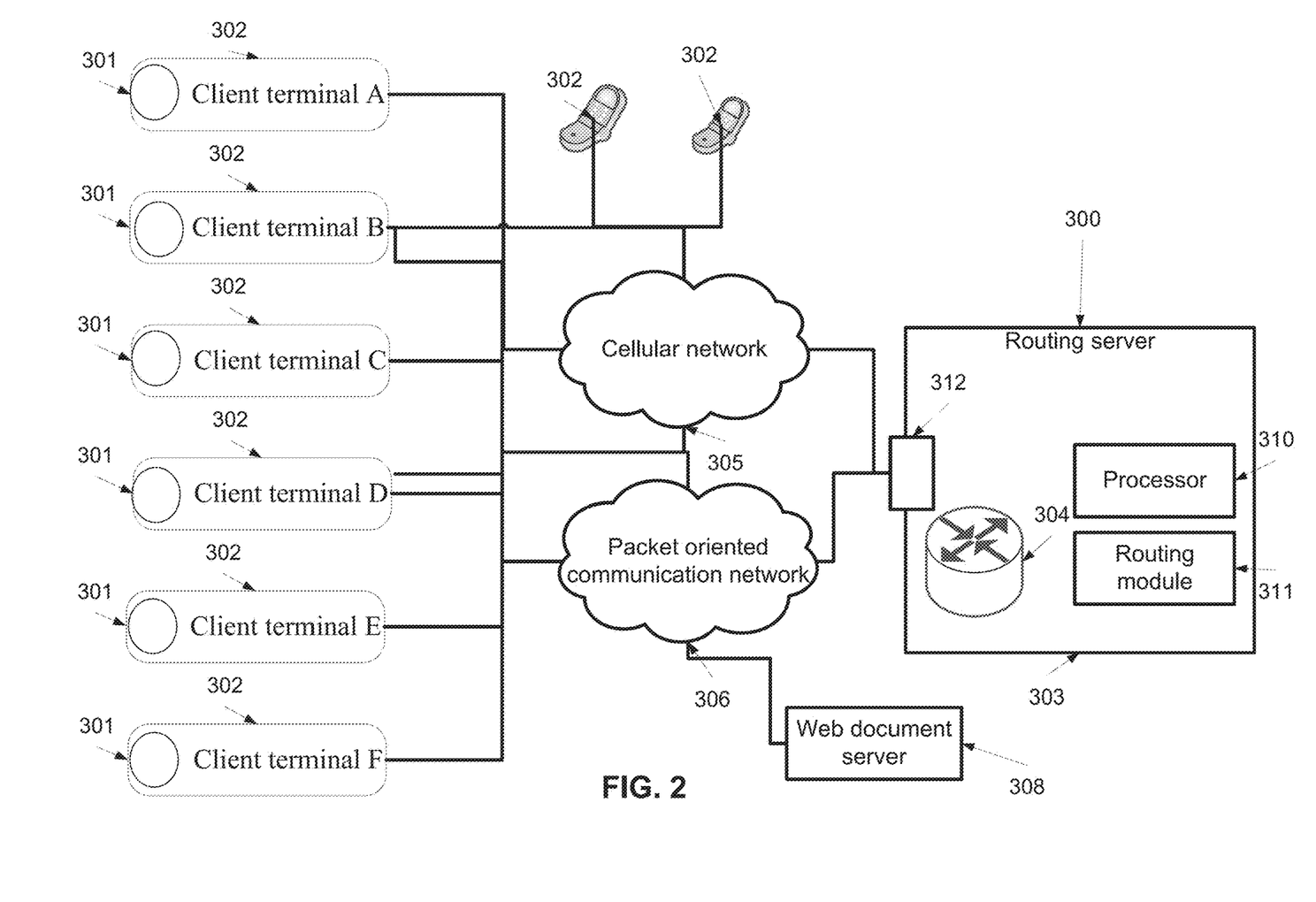
FIG. 2 is a schematic illustration of a system which includes a routing server, and cellular and packet oriented networks and client terminals, according to some embodiments of the present invention.
Figure 6:
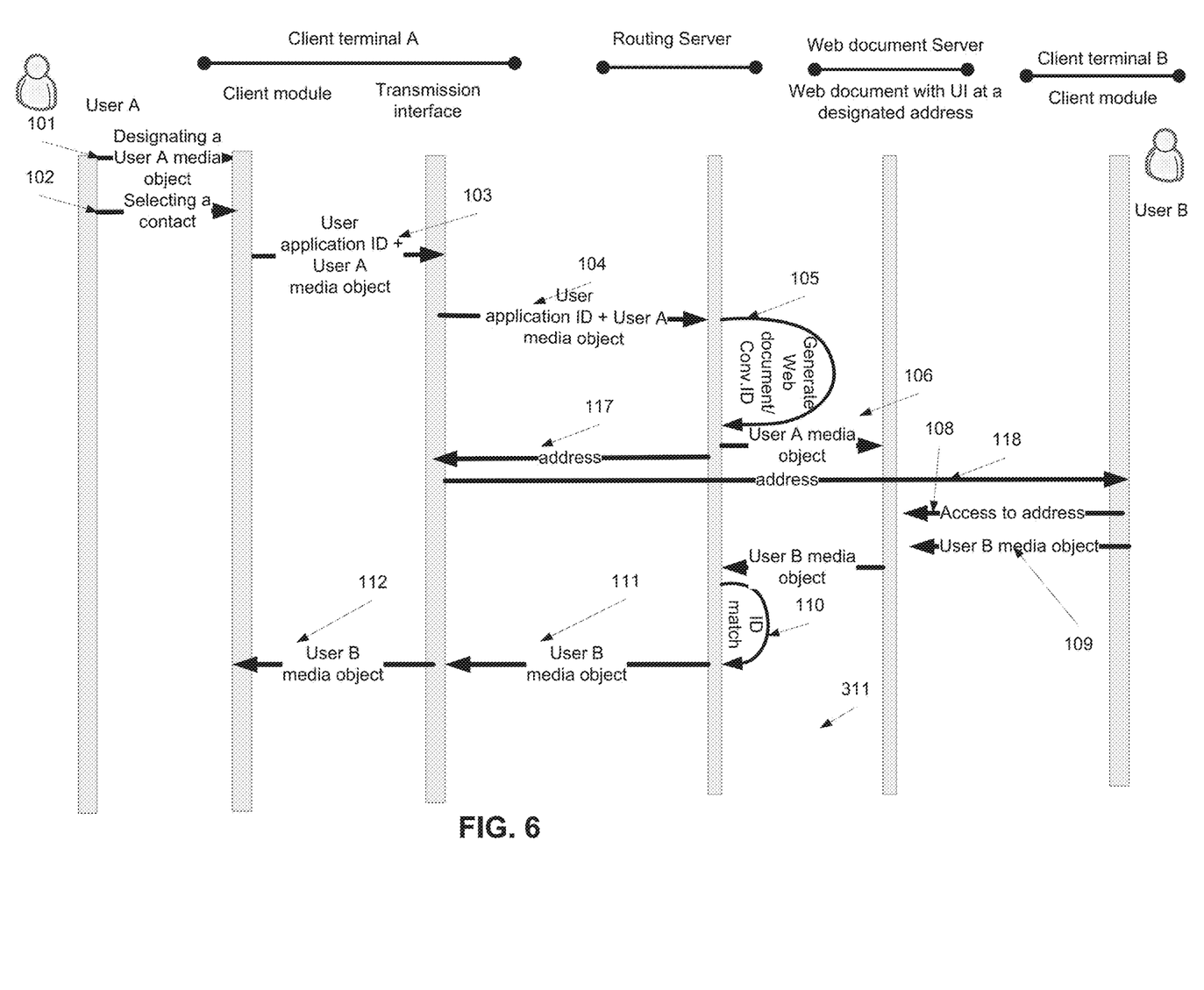
FIG. 6 is a sequence chart depicting a process for distributing the network accessible storage address using services or modules of the client hosting the transmitting application, according to some embodiments of the present invention.
Figure 7:
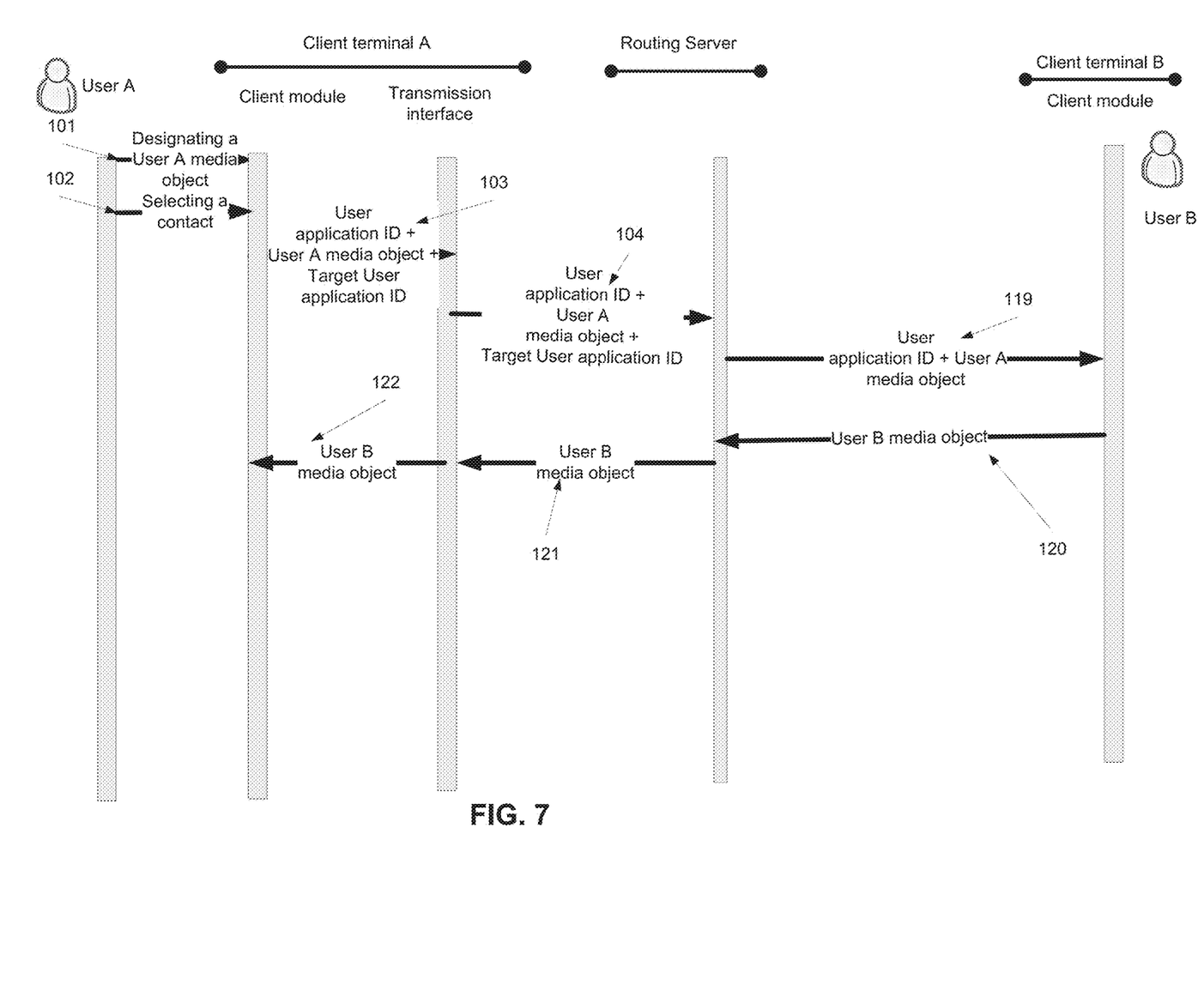
FIG. 7 is a sequence chart depicting a process wherein the media object is sent directly from the router server to the recipient and not uploaded to a web document server, according to some embodiments of the present invention.

Reference is also made to FIG. 2, which is a schematic illustration of a system 300 which includes a routing server 303 having a processor 310 and a routing module 311 executed using the processor for facilitating the processes depicted in FIGS. 1, 6 and 7, cellular and packet oriented networks 305, 306 which are connected to the routing server 301, and client terminals 302 hosting applications 301 through which media objects and contact members are selected, according to some embodiments of the present invention. The routing server 303 optionally includes or connected to one or more databases 304 of application users and conversation logging, for example as described below. The client terminal 302 may be a Smartphone, a tablet, a wearable device such as Google glass, a Smart watch, and/or the like. The client terminal of a recipient may be any device that has one or more network communication modules, such as a network card or chip and runs a web-browser. The application may be App Store application or a Google Play application installed in the client terminal, a native operating system application, and/or a browser add-on and/or application.

Reference is now made, once again, to FIG. 1. First, as shown at 101, 102, a user of a client terminal hosting an application, for example as shown at 301, uses a media object designation interface of the application to designate a media object and to select a target recipient, for example a contact member extracted from the contact dataset of the client terminal 302.

According to some embodiment of the present invention, a selection of contact member of the contact persons of the client terminal 302 and a designation of a media object are performed with a single input action, such as a single finger tap, a single gesture, consecutive double tap, the release of a finger tap and/or the like. The designation of the media object may be performed by capturing an image or a video or an audio content or by instructing a transmission of a user selected or inputted textual contact.

In such embodiments, the media object designation interface may have an image capturing area rendering output of the image sensor(s) of the client terminal and an input area having selectable icons representing different contact members such that a selection of one of the selectable icons is indicative of an instruction to capture an image or a video using the image sensor(s) and/or audio via the microphones of the client terminal and a selection contact member(s) to send an image or video content and/or audio content to.

Figure 3:
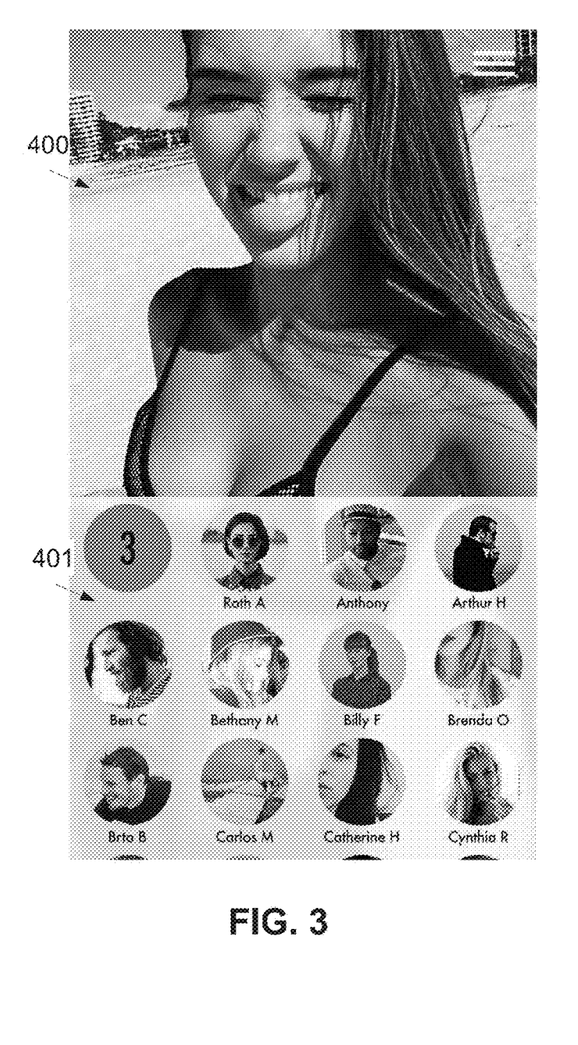
FIG. 3 is a screenshot of a window of an application presenting an image capturing area and a palette of selectable icons representing contact members from the native contact list of the operating system of the client terminal, according to some embodiments of the present invention.

For example, FIG. 3 is a screenshot of a window of an application presenting an image capturing area 400 and a palette 401 of selectable icons, for example facial images, each represents another contact member from the native contact list of the operating system of the client terminal 302. Optionally, while the image capturing area 400 presents outputs of the image sensors of the client terminal 302, for instance as a camera display, the palette 401 comprises images of contact members extracted from the contact dataset of the operating system, for instance when the application was installed or initiated. A selection of an icon induces capturing of the image (or a video and/or audio) currently presented in the display area 400 and the selection of the respective contact member as a target contact member to which the media object and/or a reference such as a link to the media object will be sent, for example as depicted in FIG. 1 and FIG. 7.

As shown at 103, the application 301 generates a message which includes a unique user identifier (ID) of the user (or the client terminal) and the media object. Optionally, the message further comprises an address of one or more selected target contact member(s), for example telephone number(s) or electronic mails (emails) extracted from the contact data of the selected contact members, for instance from contact records thereof.

As shown at 104, the message is forwarded to the transmission interface of the client application 301, for example to the wireless network or cellular communication card of the client terminal 302 which sends the message via a wireless connection to the routing server 303, for example via a network interface 312. The message is optionally documented, for example a conversation ID is now associated with the user ID in a log. For example, Table 1 is an exemplary table comprising records documenting user IDs in association with conversation IDs and with target non application users (NAU):

TABLE 1

| Conversation ID | Application user ID | Non Application user details |
|---|---|---|
| 000000000001 | 000008832332 | +1-202-894234323 |
| ... | ... | ... |
| 000002343341 | 000007777445 | +1-809-343433443 |

The conversation ID is optionally part of the network accessible storage address to allow identifying non application users who access the web document holding the media object and reactions to the media object which are received from them, for example media objects they upload.

Optionally, the data stored in the routing server is encrypted. Optionally, the messages transmitted to the routing server from the application 301 are encrypted. For example, target contact member details may be stored encrypted and decrypted by a key stored at the application 301 when needed.

As shown at 105, the routing server 303 receives the message and generates, in response to a reception of the message, a web document designed to present, when accessed by a browser, the media object from the message and optionally a user interface that allows the accessing user to react to the media object.

As shown at 106, the web document is stored in a storage location having a network accessible storage address, optionally with the conversation ID. The web document is optionally hosted in a network accessible network node, such as a web document server 308.

Now, as shown at 107, the network accessible storage address of the generated web document is sent from the network connected server to the target contact member to allow him to access the media object using a browser. For example, the network accessible storage address is sent in a cellular message, such as a short message service (SMS), and/or an email, based on the target address from message. Optionally, the routing server 303 includes cellular and/or email module(s) to facilitate the distribution of the network accessible storage address.

Figure 4A:
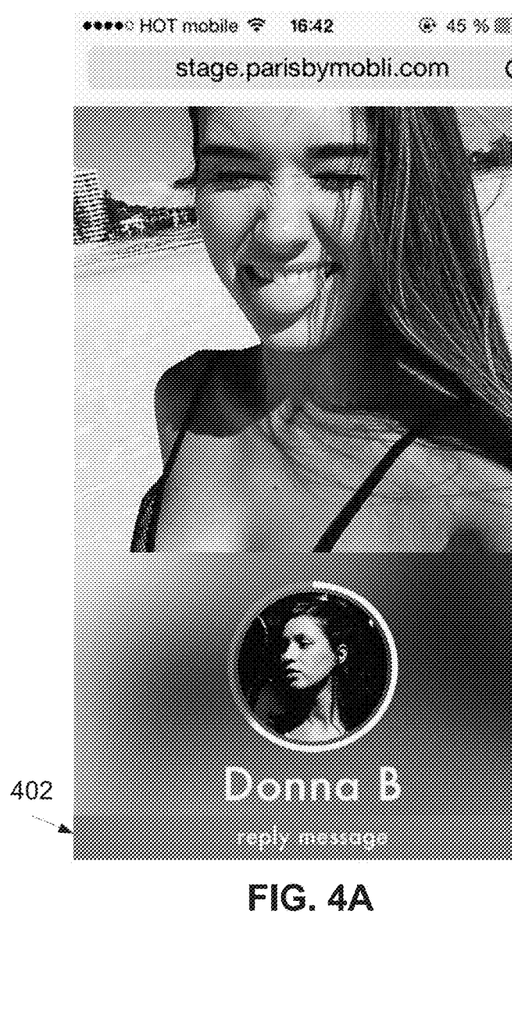
FIGS. 4A and 4B are screenshots of exemplary web documents rendered by a browser of a cellular phone and having a user interface to allow the recipient user to respond, according to some embodiments of the present invention.
Figure 4B:
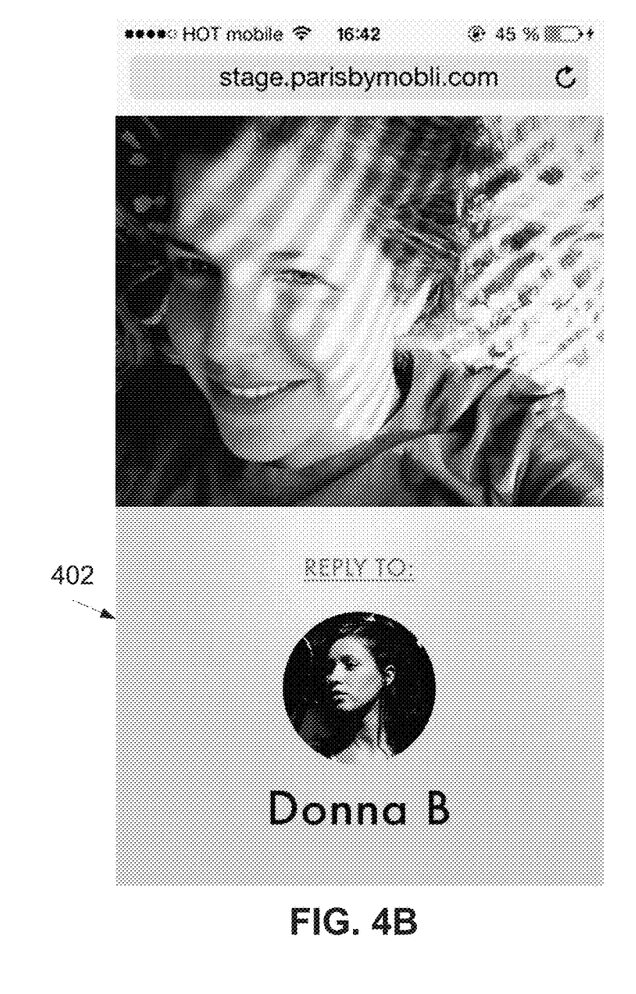

As shown at 108, the recipient of the network accessible storage address can now use the network accessible storage address to access the web document and watch the media object. For example FIGS. 4A and 4B are screenshots of exemplary web documents rendered by a browser of a cellular phone and having a user interface 402 to allow the recipient user to respond.

For example, as shown at 109, the recipient may upload his own media object, for example a textual message, an image, an audio content, or a video content using the presented user interface. The uploading is detected by the routing server 303 which uses the conversation ID from the network accessible storage address of the web document to match the user ID of the transmitting user (User A), as shown at 110 (e.g. using table 1).

As show at 111, 112, this media object is optionally uploaded to the routing server 303 which forwards it to the transmitting client terminal 302.

The process depicted in FIG. 1 allows a user who installed the application in his client terminal 302 to use the application to share media objects with a contact member which is not subscribed to the application.

Optionally, the web document is used for documenting a messaging session between the application user and a recipient which is not an application user. In such embodiments, the above process may be repeated such that the routing server 303 uploads a plurality of media objects from the application user to the web document for the non application user recipient to watch and receive via the user interface in the web document media objects for the application user to watch. While the application user watches the media objects on a GUI of the application, the recipient watches the media objects at the web document. For example, reference numeral 113 is a start of a flow wherein User A media object II is sent to be uploaded to the web document after the non application user responded to previously sent User A media object with his own media object, User B media object.

Optionally, some or all or the media objects are set to be presented for a limited period after the first presentation thereof, for example after loaded by a browser, for instance for no more than 5 seconds, 30 seconds, 1 minutes, 10 minutes, an hour or any intermediate or longer periods. Optionally any user input at the client terminal of the recipient will lead to deletion of the media object.

Instructing a browser to render a media object set to be presented for a limited time after the limited time has elapsed may be implemented by instructing the deletion of the web document from the content delivery network (CDN) and the web document server 308, for example by an hypertext transfer protocol (HTTP) DELETE REQUEST sent from a managing module in the application 301 to a respective Application Program Interface (API) in the routing server 303. The request deletes the web document from a web document database managed by the routing server 303, blocks access to the web document, and induces the transmission of a web document delete request to the web document server 308. Additionally or alternatively, the media object is deleted from a front UI presenting the media object, for example by a jquery set to remove a Cascade Style Sheets (CSS) property from the web document. Additionally or alternatively, the media object or the reference thereto is in the cache of the browsers accessing the web document is deleted or edited. For example, the property max-age of the cache-control in the header of a request for the media object and/or the media object web document is set to X seconds, for example 1, 5, 30, 60, 90, or any intermediate or longer period. When the request is sent again after the X seconds has elapsed, the browser asks the web document server 308 for the content; however, the content will be already erased.

Figure 5:
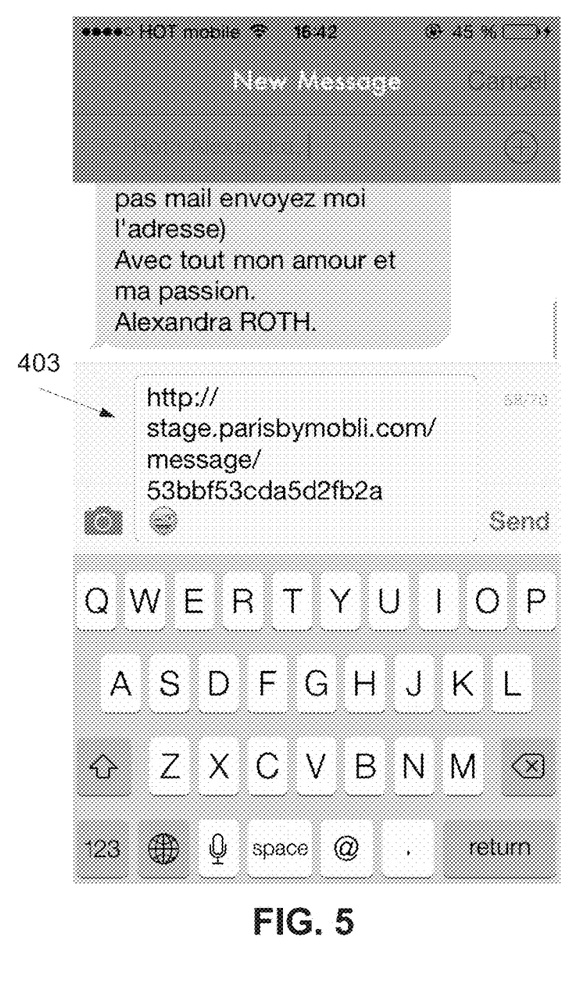
FIG. 5 is a screenshot of exemplary GUI that allows a user to send a generated network accessible storage address to a designated media object in an SMS or an instant messaging (IM) message, according to some embodiments of the present invention.

According to some embodiments of the present invention, the network accessible storage address is forwarded to the recipient by the client terminal 302 and not by the routing server 303. In such a manner, the recipient address may be maintained confidential at the client side. For example, FIG. 5 is a screenshot of exemplary GUI that allows a user to send a generated network accessible storage address to a designated media object in an SMS or an instant messaging (IM) message. Reference is also made to FIG. 6 which is a sequence chart depicting a process for distributing the network accessible storage address using services or modules of the client hosting the transmitting application, according to some embodiments of the present invention. In FIG. 6, reference numerals 101-106 and 108-112 are as described above; however, reference numerals 117 and 118 depict the transmission of the network accessible storage address to the application which transmits the network accessible storage address to the target contact member therefrom, either using a cellular messaging service or an email module installed in the client terminal, for example automatically based on instructions from the application. The address of the target contact member is extracted from the respective contact information in the client terminal.

According to some embodiments of the present invention, the processes depicted in FIGS. 1 and 6 are applied when the recipient is not registered to the services provided by the application, for example does not have the application installed in his client terminal(s). In such embodiments, the presence or the absence of an application ID associated with the selected contact member is evaluated by the client application 301 and/or the routing server 303. When presence is found, the media object is sent over a packet oriented connection between applications installed in different client terminals. When absence is found, the reference to storage of the media object is sent using an SMS service, an IM service or an email service as depicted in FIG. 1 or FIG. 6.

For example, FIG. 7 depicts a process wherein the media object is sent directly from the router server 303 to the recipient and not uploaded to a web document server. In FIG. 7, reference numerals 101-104 are as described above; however, reference numerals 119-122 depict how media objects are forwarded without any storage in a web document server or an access to a given address.

It should be noted that the presence or the absence of an application ID associated with the selected contact member may be determined at the client terminal 302 by the application 301, for example using a local table which documents who of the above contact members is subscribed to the application services and/or who of the above contact members is not subscribed to the application services.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a unit, a module, a network and a system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing media object based communication comprising:
receiving at a network connected server, from a first client terminal, a message comprising a media object, a user application identifier of a user that selected the media object using a user interface presented on a display of the first client terminal, and a target identifier;

identifying, in a local table, a presence or an absence of a target application user identifier associated with the target identifier, the target application user identifier being different from the target identifier; and in response to identifying the absence of the target application user identifier in the local table:

generating a web document that causes a given browser of a given client terminal to present the media object on the given client terminal for a limited time period after the generated web document is loaded by the given browser, the generated web document being stored at a network accessible storage address; and sending the network accessible storage address, from the network connected server to a second client terminal, using the target identifier, wherein the sending enables a particular browser of the second client terminal to use the network accessible storage address to load the generated web document and present the media object for the limited time period after the generated web document is loaded by the particular browser.

2. The method of claim 1, wherein the sending is performed in a member of a group consisting of a short message service (SMS) message, instant messaging (IM) message, and an electronic mail.

3. The method of claim 1, wherein the sending comprises forwarding the network accessible storage address to the first client terminal from the network connected server, wherein the sending is performed by the first client terminal.

4. The method of claim 3, wherein the second client terminal is associated with a contact member of the first client terminal, wherein the sending is performed by the first client terminal using an electronic mail address or a telephone number of the contact member of the first client terminal.

5. The method of claim 1, wherein the generating comprises documenting a conversation identifier in association with the user identifier and adding the conversation identifier to the network accessible storage address, wherein the identifying comprises using the conversation identifier to match the user identifier.

6. The method of claim 1, wherein the target identifier is selected from a group consisting of a target telephone number and an email address.

7. The method of claim 1, wherein the sending of the network accessible storage address to the second client terminal is performed by the network connected server.

8. The method of claim 1, wherein the generated web document causes the given browser of the given client terminal to present the media object on the given client terminal for the limited time period after the generated web document is loaded by the given browser by:

causing removal of a cascade style sheet property associated with the generated web document after the generated web document is loaded by the given browser, the removal of the cascade style sheet property causing the media object to stop being presented by the given browser.

9. A non-transitory computer readable storage medium comprising computer executable instructions adapted to perform the method of claim 1.

10. A system of managing media object based communication comprising:

a processor;

a network interface adapted to receive from a first client terminal, a message comprising a media object, a user application identifier (ID) of a user that selected the media object using a user interface presented on a display of the first client terminal, and a target identifier;

a non-transitory computer readable storage medium having instructions stored there on, which, when executed by the processor, cause the system to perform operations comprising:

identifying, in a local table, a presence or an absence of a target application user identifier associated with the target identifier, the target application user identifier being different from the target identifier; and in response to identifying the absence of the target application user identifier in the local table:

generating a web document that causes a given browser of a given client terminal to present the media object on the given client terminal for a limited time period after the generated web document is loaded by the given browser, the generated web document being stored at a network accessible storage address; and sending the network accessible storage address, to a second client terminal, using the target identifier, wherein the sending enables a particular browser of the second client terminal to use the network accessible storage address to load the generated web document and present the media object for the limited time period after the generated web document is loaded by the particular browser.

11. The method of claim 1, comprising in response to identifying the absence of the target application user identifier UM in the local table:

identifying a usage of said a browser user interface, presented by the web document, for inputting a reaction to the media object by a user of the second client terminal; and forwarding the reaction, via the network connected server, to the first client terminal using the user application identifier.

12. The system of claim 10, wherein the operations further comprise identifying a usage of the browser user interface for inputting a reaction to the media object by a user of the second client terminal and the network interface is adapted to forward the reaction to the first client terminal using the user application identifier.

* * * * *

UNITED STATES PATENT AND TRADEMARK OFFICE
CERTIFICATE OF CORRECTION

PATENT NO. : 10,630,625 B2
APPLICATION NO. : 14/797263
DATED : April 21, 2020
INVENTOR(S) : Hogeg et al.

Page 1 of 1

It is certified that error appears in the above-identified patent and that said Letters Patent is hereby corrected as shown below:

In the Claims

In Column 14, Line 42, in Claim 11, after "identifier", delete "UM"

In Column 14, Line 43, in Claim 11, after "of", delete "said"

Signed and Sealed this
Twenty-fourth Day of November, 2020

Andrei Iancu
*Director of the United States Patent and Trademark Office*